W. H. KRUG.
ANTISKID DEVICE.
APPLICATION FILED FEB. 8, 1919.
1,330,194. Patented Feb. 10, 1920.
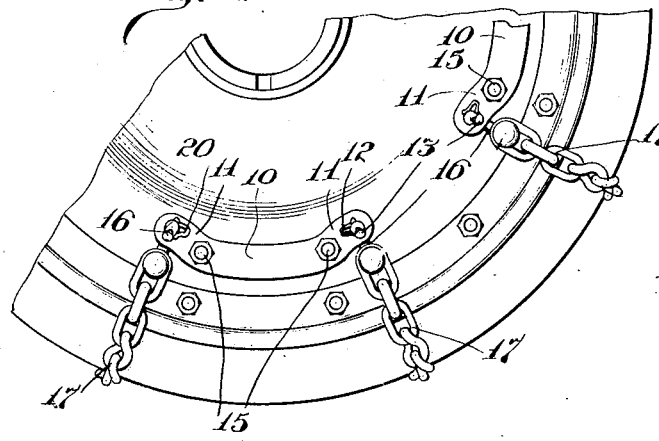
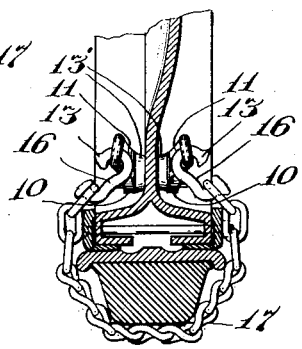
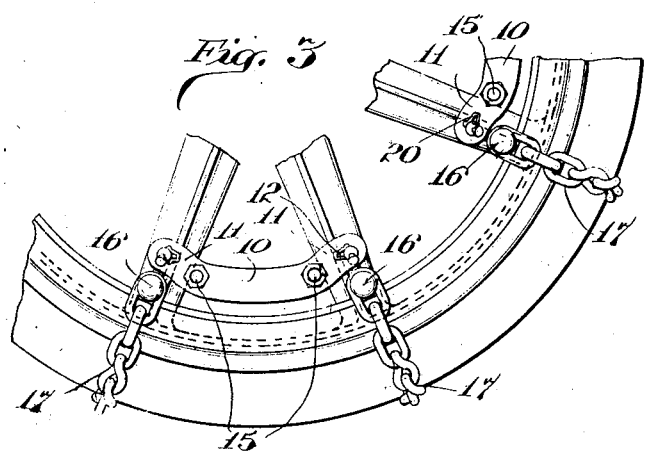
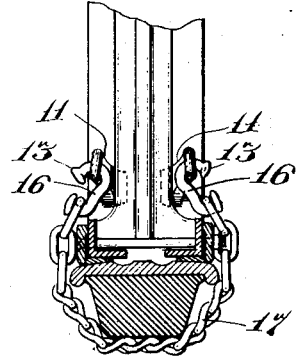
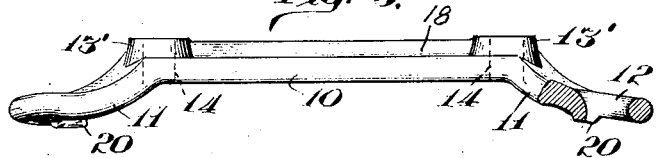
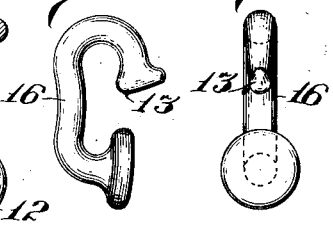
Inventor
William H. Krug

UNITED STATES PATENT OFFICE.

WILLIAM H. KRUG, OF OSHKOSH, WISCONSIN.

ANTISKID DEVICE.

1,330,194.  Specification of Letters Patent.  Patented Feb. 10, 1920.

Application filed February 8, 1919. Serial No. 275,921.

*To all whom it may concern:*

Be it known that I, WILLIAM H. KRUG, a citizen of the United States, residing at Oshkosh, in the county of Winnebago and State of Wisconsin, have invented a certain new and useful Improvement in Antiskid Devices, of which the following is a full, clear, concise, and exact description, reference being had to the accompanying drawings, forming a part of this specification.

My invention relates to improvements in anti-skid devices and is especially concerned with improvements in means for securing anti-skid chains to vehicle wheels, and especially to truck wheels or to the wheels of other vehicles which carry comparatively heavy loads. My invention is not, however, limited to this use.

The object of my invention is to provide means which can be interchangeably used for easily and quickly securing anti-skid chains to vehicle wheels of either the spoke or disk type. Heretofore entirely different means have been required for securing chains to these two different types of wheels. It is the object of my invention, as stated above, to provide means which can be interchangeably used upon both types of wheels.

Other objects will appear as this description progresses, reference being had to the accompanying drawings, in which—

Figure 1 is a side elevation of a portion of a disk wheel equipped with my novel means for securing anti-skid chains thereto;

Fig. 2 is a section through the wheel shown in Fig. 1, showing my improved devices in end elevation;

Fig. 3 is a view corresponding to Fig. 1, showing my improved devices attached to a spoke wheel;

Fig. 4 is a section through the wheel shown in Fig. 3, showing my novel clamping device in end elevation;

Fig. 5 is an edge view of one of the clamping members which I employ for securing anti-skid chains to a vehicle wheel;

Fig. 6 is a side elevation thereof; and

Figs. 7 and 8 are two views showing the coupling member which I employ for securing each end of the anti-skid chains to the clamping bars or members shown in Figs. 5 and 6.

My invention comprises certain modifications of the structure disclosed in the application of George S. Everhart, Serial No. 202,631, filed November 17, 1917. By these modifications I am enabled to produce a device which may be used interchangeably for securing anti-skid chains to either a disk or a spoke type of wheel. This means, as disclosed in the various figures of the drawings, comprises a clamping bar having a central portion 10 and end portions 11, which are offset from the plane of the central portion 10, as shown in Figs. 2, 4 and 5, and also offset edgewise of said central portion, as shown in Figs. 1, 3 and 6. The end portions 11 are provided with keyhole slots 12, through which the cross heads 13 of the coupling members, shown in Figs. 7 and 8, are adapted to be manipulated, as will be described later on. Bosses 13' are integrally formed with the central portion 10 of the clamping bars or members adjacent the ends of the central portions of the bars. Openings 14 are formed through the bars and the bosses 13' to receive the bolts 15, by means of which the clamping bars are secured to the wheels.

The bosses 13' perform two functions. In the construction shown in Figs. 1 and 2, wherein the clamping bars are shown secured to a disk type of wheel, by means of the bolts 15 which extend through the disk the bosses serve to space the offset ends 11 of the clamping bars a sufficient distance from the disk to permit the proper manipulation of the coupling members 16 to secure the chains 17 to the clamping members. The bosses 13' also act as reinforcing means to reinforce the clamping bars at the points where the openings 14 pass therethrough.

In Figs. 3 and 4 I have illustrated my improved devices attached to a spoke type of wheel. In this construction somewhat longer bolts are required for securing the clamping members to the wheels. The end of the clamping members are clamped against the spokes by means of the bolts 15, and these bolts likewise serve to prevent movement of the clamping bars in a direction parallel with the felly.

The coupling members 16 are similar to those described and claimed in my co-pending application Serial No. 235,435, and are manipulated through the keyhole slots 12 in the manner described in this application. Further description thereof and of the manner in which they are connected with the clamping bars or members is, therefore, believed to be unnecessary. Each of the clamping bars is provided with the longitudinal reinforcing rib 18 which reinforces the clamping bars against transverse strains imposed thereon by reason of the clamping action of the bolts 15.

It is, of course, to be understood that sufficient slack is provided in the chains 17 to permit the coupling members 16 to be properly manipulated to cause the cross heads 13 to pass through the keyhole slots 12.

At 20 I have shown small ribs surrounding the slot of the openings 12, which project from the outer faces of the clamps a slight distance. The function of these ribs is to prevent the coupling members from being accidentally moved into a position in which the crossheads will pass through the openings 12. It sometimes happens during the operation of a truck equipped with my improved devices that the coupling members assume positions in which their crossheads bear against the outer faces of the clamping bars, but with the crossheads arranged at right angles to the length of the keyhole openings the ends of the ribs 20 function as stops to prevent the crossheads from rotating to a position parallel with the length of the keyhole openings and thus prevent the coupling member from becoming detached from the clamping bars.

While I have described the details of the preferred embodiment of my invention, it is to be understood that my invention is not limited to these details except by the scope of the appended claims, and it is to be especially understood that my invention is not limited to the particular means illustrated and described for securing the ends of the anti-skid chains to the clamping members.

Having thus described my invention, what I claim is:—

1. Means for securing anti-skid chains to either a spoke or a disk type of wheel, comprising a bar having end portions offset from the plane of the central portion thereof, the central portion of said bar being provided with openings for receiving bolts for securing said bars to a wheel, and means for reinforcing said bar at the points where said openings pass through, and for spacing said bar from the disk of a disk type of wheel, the end portions of said bar being provided with means for securing the ends of anti-skid chains.

2. Means for securing anti-skid chains to either a spoke or a disk type of wheel, comprising a bar having end portions offset from the plane of the central portion thereof, the central portion of said bar being provided with openings for receiving bolts for securing said bars to a wheel, and means for spacing said bar from the disk of a disk type of wheel, the end portions of said bar being provided with means for securing the ends of anti-skid chains.

3. Means for securing an anti-skid chain to either a spoke or a disk type of wheel, comprising a bar having end portions offset from the plane of the central portion thereof, integral means for spacing the central portion of said bar from the disk of a disk type of wheel, and means for securing a chain to each of the offset end portions.

4. Means for securing an anti-skid chain to either a spoke or a disk type of wheel, comprising a bar having means for spacing the central portion and end portions thereof from the disk of a disk type of wheel, and means for securing a chain to one end thereof.

5. Means for securing a chain to either a spoke or a disk type of wheel, comprising a bar provided with a pair of openings, and means for reinforcing said bar at said openings, and for spacing said bar from the disk of a disk type of wheel.

6. Means for securing a chain to either a spoke or a disk type of wheel, comprising a bar provided with a pair of openings, and means for reinforcing said bar, and for spacing said bar from the disk of a disk type of wheel.

7. Means for securing an anti-skid chain to either a spoke or a disk type of wheel, comprising a bar provided with means for securing one end of an anti-skid chain thereto, and means for spacing said bar from the disk of a disk type of wheel.

8. The combination with a vehicle wheel, of an elongated bar having end portions offset from the plane of the central portion of said bar, the said end portions being provided with means for securing the end of an anti-skid chain, and means for securing said bar to a wheel so that said offset end portions will project in a direction away from the plane of said wheel.

In witness whereof, I hereunto subscribe my name this 5th day of February, 1919.

WILLIAM H. KRUG.

Witnesses:
 MARY FAE PETRIE,
 ANDREW WINTERCORN.